April 20, 1965  C. R. GULBRANSEN, JR., ETAL  3,178,833
SIMULATOR
Filed March 25, 1963  5 Sheets-Sheet 1

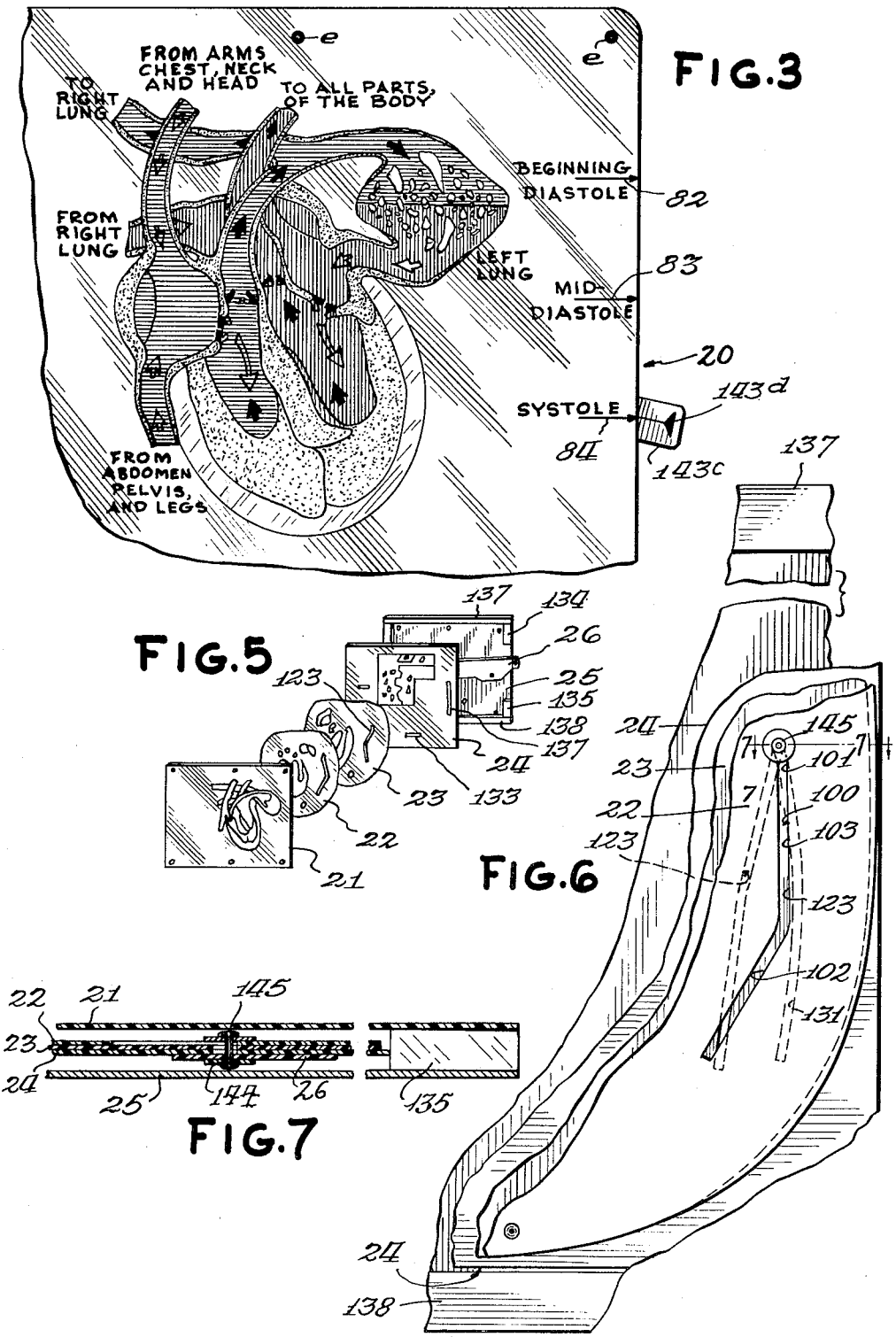

April 20, 1965  C. R. GULBRANSEN, JR., ETAL  3,178,833
SIMULATOR
Filed March 25, 1963  5 Sheets-Sheet 3

United States Patent Office 3,178,833
Patented Apr. 20, 1965

3,178,833
SIMULATOR
Capron R. Gulbransen, Jr., Barrington, and Roland C. Zagnoli, Highland Park, Ill., assignors to Abbott Laboratories, North Chicago, Ill., a corporation of Illinois
Filed Mar. 25, 1963, Ser. No. 267,422
1 Claim. (Cl. 35—17)

This invention relates to a simulator and in particular to an apparatus for simulating heart action, the flow paths the blood takes as it is pumped from and returned to the heart, and the action of the heart valves.

It is one of the purposes of the invention to provide a simulator useful for teaching the manner in which the heart expands and contracts, the paths of blood to and from the heart under varying degrees of expansion and contraction of the heart, and the operation of the heart valves.

It is another feature of the invention to provide an apparatus in which various components are movable relative to each other so that the foregoing expanding and contracting movements of the heart, the flow of blood, and the operation of the heart valves are simulatable.

It is another feature of the invention to provide a simulator which fully serves its purposes and at the same time is economical to manufacture.

In the diagrammatic, illustrative drawings:

FIGURE 3 is a fragmentary front elevational view, showing the simulator positioned at systole;

FIGURE 5 is an exploded isometric view of the various components of the simulator;

FIGURE 6 is a fragmentary front elevational view, showing the interrelation of cam slots on each of three sheets of the simulator;

FIGURE 7 is a cross-sectional view taken along line 7—7 of FIGURE 6;

Figure 1:
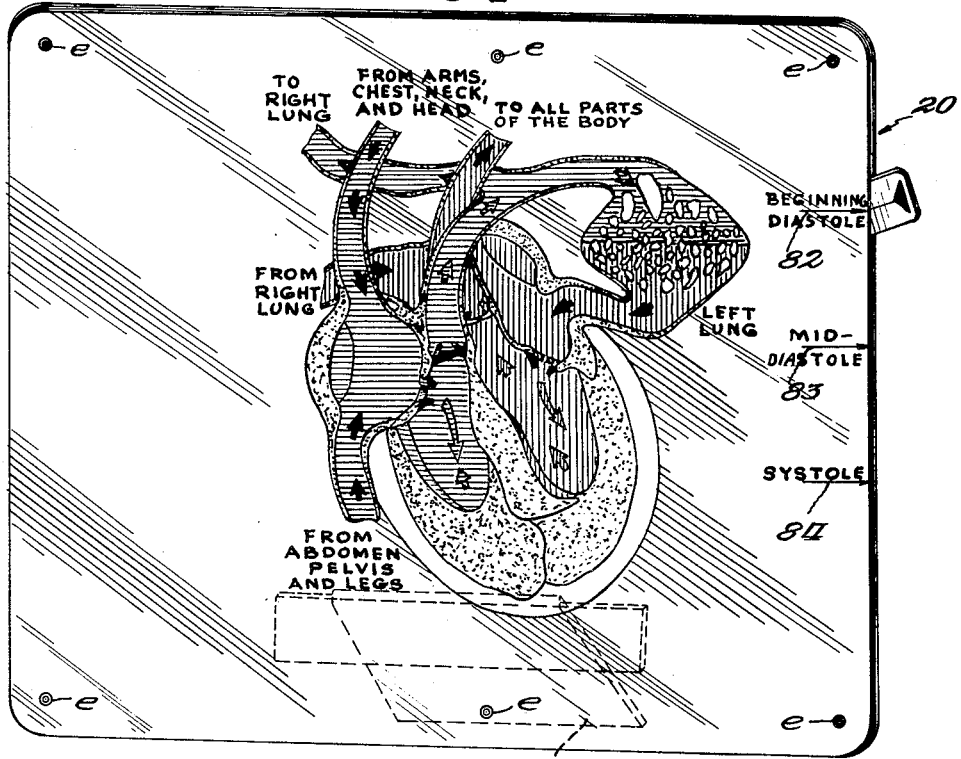
FIGURE 1 is a perspective view of the simulator of the invention, showing the simulator positioned at beginning diastole.

Referring now to the illustrative drawings, there is shown a simulator generally indicated at 20. As best shown in FIGURE 5 of the illustrative drawings, the simulator 20 of the invention is shown to include a first sheet 21, a second sheet 22, a third sheet 23, a fourth sheet 24, and a fifth sheet 25, with a manually operable lever 26 disposed between the fourth sheet 24 and the fifth sheet 25.

The first sheet 21 has printed thereon representations of the outlines 27 and 28 of left and right heart auricles, which serve to define partially the boundary of left and right auricular heart cavities, portions of which are represented by transparent areas 29 and 30, respectively. The remaining portion of each auricular cavity is shown to be rendered at least translucent and preferably opaque with printed area portions generally indicated at 29p and 30p.

Also printed on the first sheet 21 are left and right ventricular cavity portion representations 33 and 34 to be separated by a wall representation 35. The left and right ventricular cavity portion representations 33 and 34 represent the minimum blood volume of the left and right ventricles. Surrounding the left and right ventricular cavity portion representations 33 and 34 and the wall representation 35 is a transparent area 38 which is in contrast to a translucent or preferably opaque field 39 which comprises most of the first sheet 21.

Leading into the left auricular outline representation 27 is a pulmonary vein representation generally indicated at 40 which is defined by vein outline representations 41 and 42. The pulmonary vein representation 40 leads from a left lung representation 43. A pulmonary artery representation 44 defined by artery outlines 45 and 46, leads from the right ventricular cavity portion representation 34 to the left lung representation 43. An aorta, or main artery, representation generally indicated at 47, defined by artery outline representations 48 and 49, is shown to lead from the left ventricular cavity portion representation 33. A main vein representation generally indicated at 50 leading from the arms, chest, neck and head (not shown), is defined by main vein outlines 51 and 52. Similarly, a main vein representation generally indicated at 53, leading from the abdomen, pelvis and legs (not shown), is defined by main vein outline representations 54 and 55. Another pulmonary vein representation generally indicated at 56, leading from a right lung (not shown) and defined by vein outline representations 57 and 58 leads to the left auricle within the left auricular outline representation 27.

A branch pulmonary artery representation 44A defined by artery outline representations 44a and 44b and the right auricular outline representation 28, leads from the pulmonary artery representation 44. Along the pulmonary artery representations 44 and 44A are disposed arrow-shaped transparent areas 59, 60 and 61 and 62 and 63, respectively. Along the pulmonary vein representation 40, there are disposed arrow-shaped transparent areas 64 and 65. Along the main vein representations 50 and 53 there are disposed arrow-shaped transparent areas 66, 67 and 68 and 69 and 70, respectively. In the right ventricular cavity portion representation 34, there are shown arrow-shaped transparent areas 71 and 72. Along the main artery representation 47 there is shown an arrow-shaped transparent area 73. Along the pulmonary vein representation 56, there is shown an arrow-shaped transparent area 74. The representation 33 has transparent arrow-shaped areas 67′, 67″ and 68′.

A heart valve representation 78, disposed along the left auricle outline representation 27, is made up of transparent area portions 78a, 78b and 78c. Between the left ventricle representation 33 and the main artery representation 47 are transpartent areas which define a heart valve representation 79. The heart valve representation 79 is made up of transparent area portions 79a, 79b and 79c. A heart valve representation 80, disposed along the right auricular outline representation 28 is made up of the transparent area portions 80a, 80b and 80c. Disposed between the right ventricular cavity portion representation 34 and the pulmonary artery representation 44 are transparent areas 81a, 81b and 81c which define a heart valve representation 81.

As shown only in FIGURE 1 of the illustrative drawings, the first sheet 21 also has printed thereon indicia 82, 83 and 84 which indicate "beginning diastole, mid-diastole, and systole," respectively. "Beginning diastole" is a medical term which designates the beginning of the expansion of the heart during the cycle of heart action. "Mid-diastole" is a medical term which designates the position of maximum expansion of the heart during the cycle of the heart action. "Systole" is a medical term which designates the position of maximum contraction of the heart during the cycle of the heart action.

Figures 10, 11:
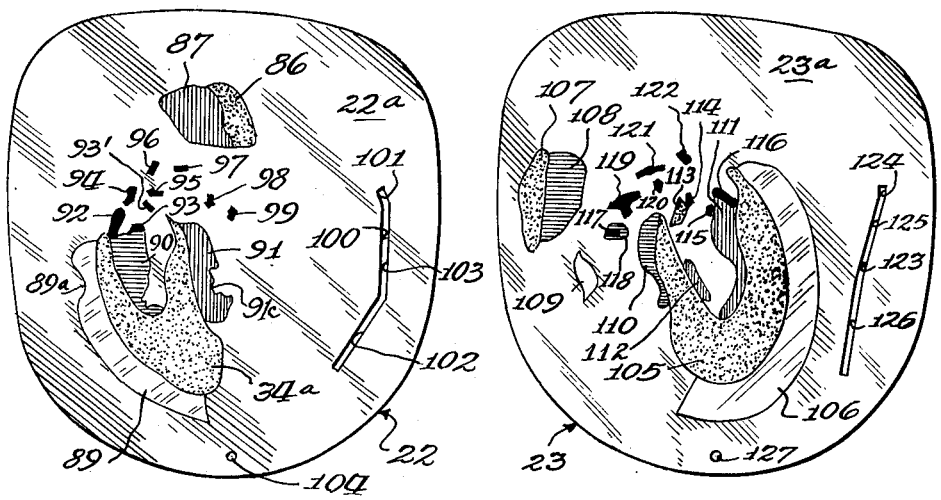
FIGURE 10 is a front elevational view of one of the sheets of the simulator.
FIGURE 11 is a front elevational view of another sheet of the simulator.
Figure 12:
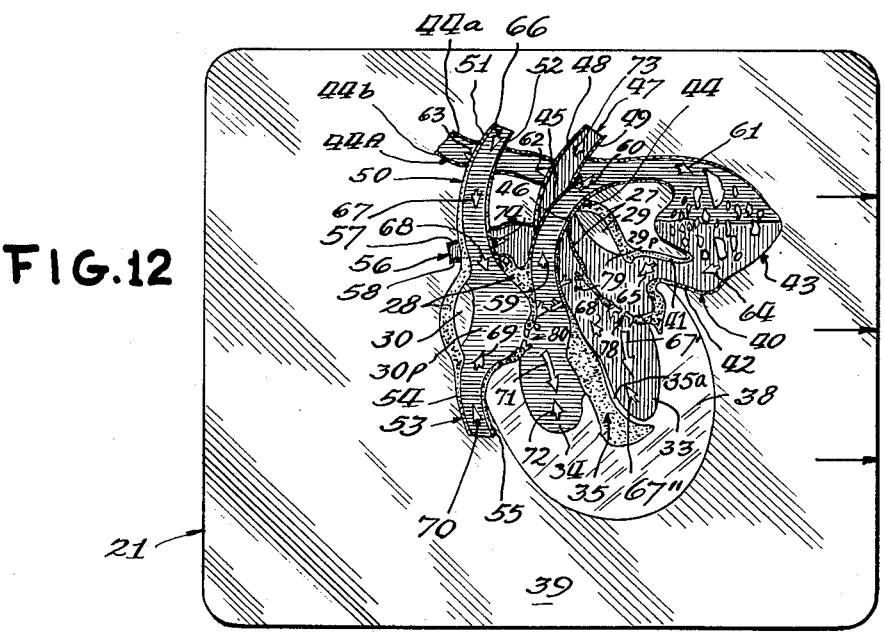
FIGURE 12 is a front elevational view of yet another sheet of the simulator.
Figure 13:
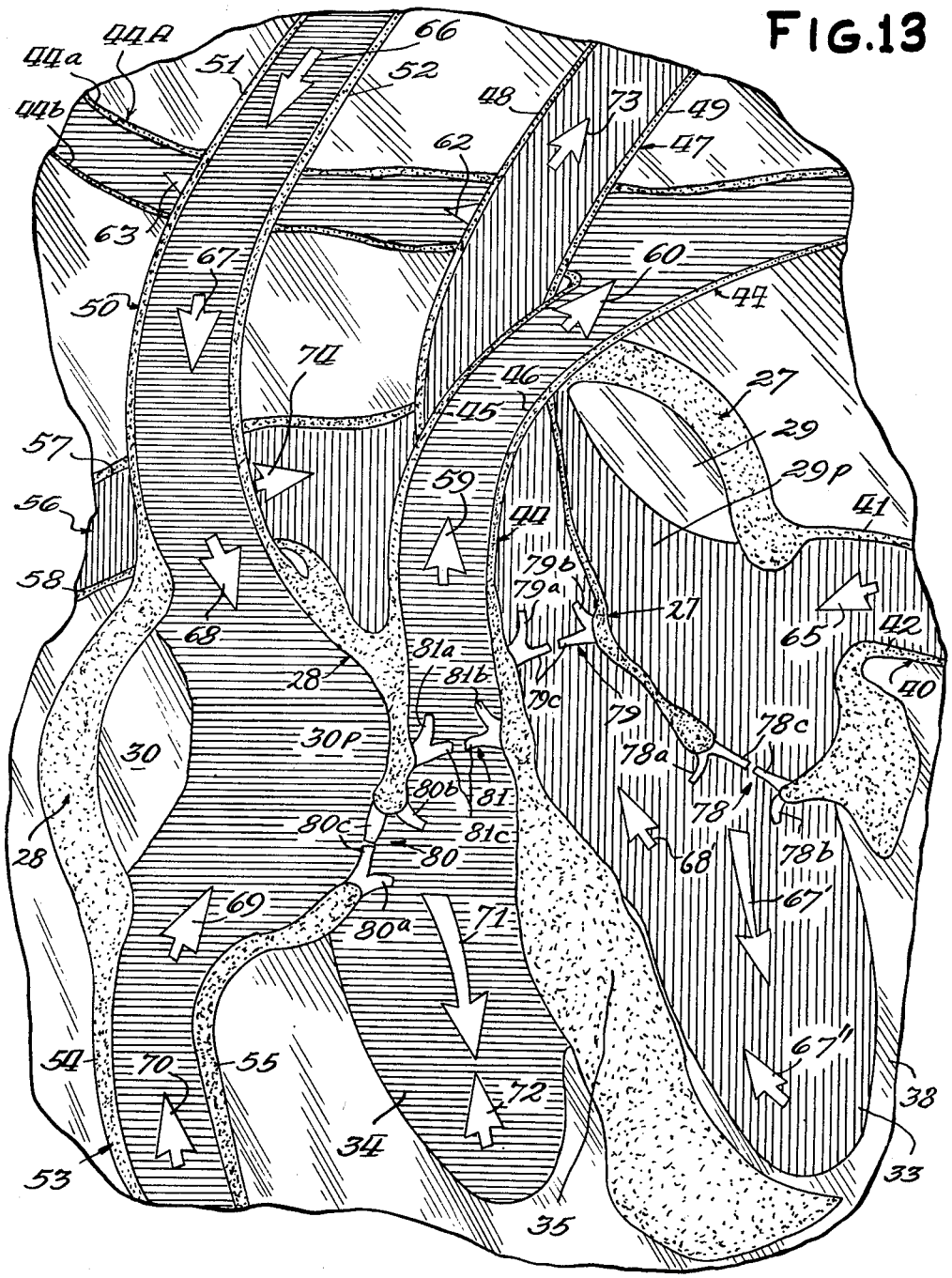
FIGURE 13 is a front elevational fragmentary view of the sheet shown in its entirety in FIGURE 12.

The second sheet 22, detailed in FIGURE 10 of the illustrative drawings, is shown to have a transparent field 22a. Printed on the second sheet 22 is an unoxygenated blood representation 86 of the left auricle and a contiguous oxygenated blood representation 87. As the left auricle contracts, the observer will progressively see more and more of the representation 86 and see less and less of the representation 87. There is also shown on the second sheet 22 a right ventricle cavity portion outline representation 34a which is shown to be bounded on one side by a printed area 89. A cavity portion representation 90, contiguous with the right ventricle outline representation 34a, is completely covered by the right ventricle cavity 37 at systole. As the heart begins to expand, the cavity portion representation 90 is brought into overlapping relationship with respect to the right ventricle cavity portion representation 34 so as to simulate the expanded position of the right ventricle. A printed area 91 is completely overlapped by the left ventricular cavity portion representation 33 at beginning diastole. A printed area 92 underlies and blocks-off the transparent area portion 80c at systole, indicating that the heart valve 80 is in the closed position. A printed area 93 underlies the transparent area portion 80c at mid-diastole, indicating that the heart valve 80 is in the open position. A printed area 93' underlies a transparent area portion 80b at mid-diastole, indicating that the valve 80 is in the open position. A printed area 94 underlies and blocks-off a transparent area portion 81a of the heart valve 81 at systole, indicating that the heart valve 81 is in the open position. A printed area 95 underlies and blocks-off a portion of the transparent area portion 81c from beginning diastole until just before systole. A printed area 96 underlies a transparent area portion 79a of the heart valve 79 on the first sheet 21 at systole, indicating that the heart valve 79 is in the open position. A printed area 97 underlies a transparent area portion 79c on the first sheet 21 until just before systole. A printed area 98 underlies and blocks-off a transparent area portion 78b at beginning diastole, indicating that the heart valve 78 is in the open position. A printed area 99 underlies a transparent area portion 78b when the heart valve 78 is at beginning diastole.

The second sheet 22 has a generally longitudinally extending cam slot 100 with a short cam slot portion 101 which is inclined slightly to the left of the vertical in an upwardly extending direction and a cam slot portion 103 which is inclined to the left which respect to the vertical in a downwardly extending direction joined by a generally vertical cam slot portion 103 as viewed in FIGURE 10 of the illustrative drawings. The second sheet 22 also has provided therein an aperture 104.

The third sheet 23 is shown to have a transparent field 23a. The third sheet 23 has printed thereon a left ventricle cavity outline portion representation 105. The representation 105 is bounded by a contiguous printed area 106. Printed on the third sheet 23 is a portion of a right auricle representation 107 which underlies the auricle outline representation 28 and the opaque field 39 at beginning diastole and is uncovered more and more in overlapping relationship to show the contraction of the right auricle as mid-diastole is approached. Contiguous to the representation 107 is a printed area 108 which illustrates the blood which fills the right auricular cavity. A printed area 109 completes the area portion 89 at 89a at systole. A printed area 110 underlies and blocks-off the arrow-shaped transparent area 71 at beginning diastole and from approximately midway between mid-diastole and systole to systole. A printed representation 111 underlies and blocks-off the arrow-shaped transparent area 67'a on the first sheet 21 at beginning diastole and at systole. A printed area 112 underlies and fills in for a generally concave area 91c in printed area 91 to block-off transparent area 35a except at systole. A printed area 113 underlies and blocks-off the transparent area portion 68' on the first sheet 21 until just prior to systole; a contiguous printed representation 114 underlies and blocks-off the transparent area portion 78a at mid-diastole. A printed representation 115 underlies and blocks-off transparent area 78b at mid-diastole. A printed area 116, which is contiguous to the printed areas 105 and 111 underlies and blocks-off transparent area portion 78c at systole, indicating that the heart valve 78 is in the closed position. A printed area 117 underlies and blocks-off the transparent area portion 80a at beginning diastole and just before systole; a contiguous printed area 118 underlies and blocks-off the transparent area portion 80a at systole. A printed area 119, which underlies and blocks-off the transparent area 80b at beginning diastole and just before systole and blocks-off a portion of the transparent area 81c from beginning diastole to shortly before systole. A printed area 120 underlies and blocks-off the transparent area 81b at systole. A printed portion 121 underlies and blocks-off the transparent area portion 79c from beginning diastole to shortly before systole. A printed portion 122 underlies the transparent portion 79b at systole.

The third sheet 23 is provided with a generally longitudinally extending cam slot 123 which includes a generally vertical cam slot portion 124, a cam slot portion 125 inclined to the left of the vertical end extending in a downward direction at a given angle, and a cam slot portion 126 extending to the left of the vertical in a downward direction at a slightly lesser angle, as viewed in FIGURE 11 of the illustrative drawings. The third sheet 23 is provided with an aperture 127.

Figure 9:
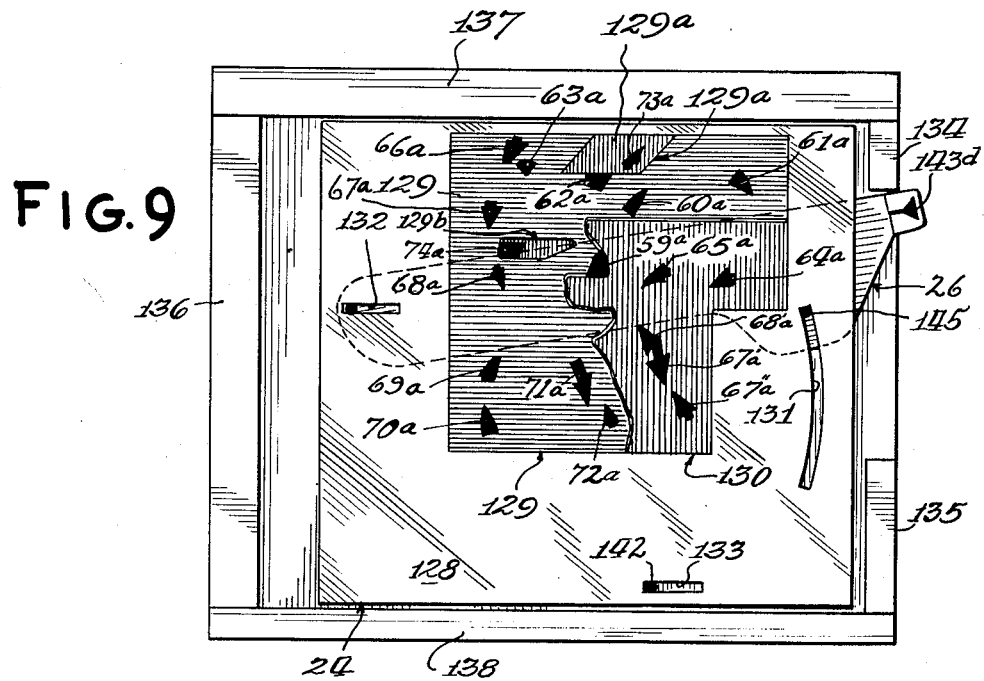
FIGURE 9 is a front elevational view of two of the sheets of the simulator with the lever disposed therebetween.

The fourth sheet 24, detailed in FIGURE 9 of the illustrative drawings, comprises a sheet of material on which there is printed a field of opaque or preferably translucent coloring indicated at 128. Within the field 128 there lie two large opaque or preferably translucent fields 129 and 130. The field 129 contains printed areas 59a, 60a, 61a, 62a, 63a, 66a, 67a, 68a, 69a, 70a, 71a, 72a, and 74a which selectively block-off corresponding arrow-shaped transparent areas 59, 60, 61, 62, 63, 66, 67, 68, 69, 70, 71, 72 and 74. The arrow-shaped transparent areas 59, 60, 61, 62, 66, 67, 68, 69, 70, 71, 72 and 74 are either blocked-off by the printed portions 59a, 60a, 61a, 66a, 67a, 68a, 69a, 70a, 71a, 72a and 74a or the field 129. Within the field 129 are two minor fields 129a and 129b. The minor field 129a contains a printed area 73a which underlies and blocks-off the arrow-shaped transparent area 73 at systole while the minor field 129a blocks-off the arrow-shaped transparent area 73 the remainder of the time. Similarly, the minor field 129b blocks-off the arrow-shaped transparent area 74 except at beginning diastole, at which the arrow-shaped transparent area 77 is blocked-off by a printed area 74a. At all other times the field 129b blocks-off the transparent area 74. The field 130 has printed portions 64a, 65a, 67'a, 68'a and 67"a which underlie and selectively block-off the arrow-shaped transparent areas 64, 65, 67', 68' and 67". When the transparent areas 64, 65, 67', 68' and 67" are not blocked-off by the printed portions 64a, 65a, 67'a, 68'a and 67"a, the field 130 blocks-off the same.

Figure 2:
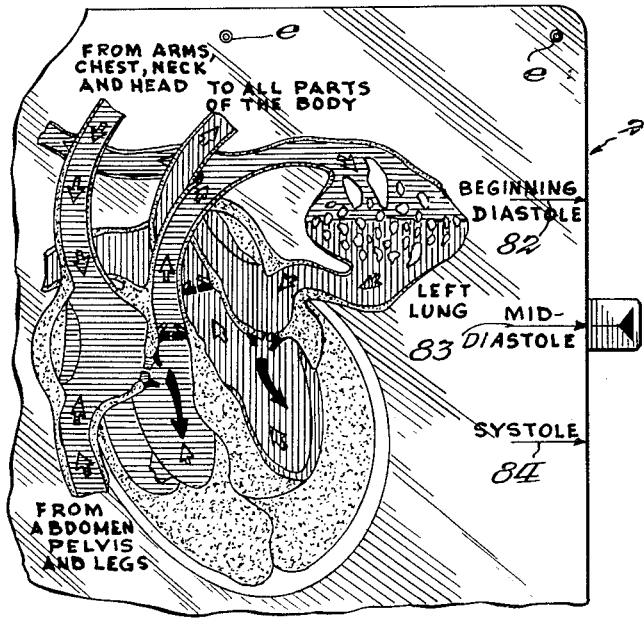
FIGURE 2 is a fragmentary front elevational view of the simulator, showing the simulator positioned at mid-diastole.
Figure 4:
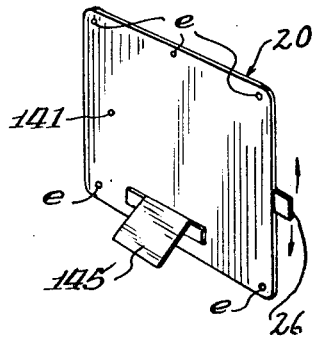
FIGURE 4 is a perspective rear view of the simulator.
Figure 8:
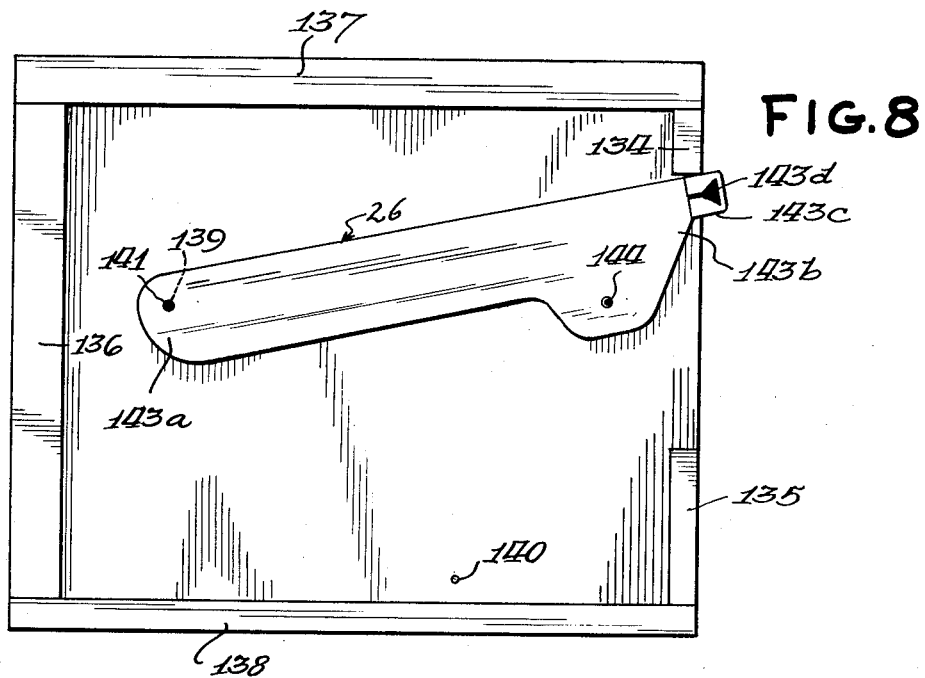
FIGURE 8 is a front elevational view of one of the sheets and a lever.

FIGURES 1, 2 and 3 indicate the flow of blood, the position of the heart valves 78, 79, 80 and 81, the contraction and expansion of the auricles and ventricles of a heart in the cycle of heart action at beginning diastole, mid-diastole and systole, respectively. The sheets 21, 22 and 23 are preferably composed of a transparent plastic material on which there are printed areas, while the fourth sheet 24 is constructable of any suitable material such as an opaque plastic material. The fifth sheet is constructable of a fiber composition, cardboard or any suitable substantially rigid material.

The above-described embodiment being exemplary only, it will be understood that modifications in form or detail are within the purview of the invention. Accordingly, the invention is not to be considered as limited save as is consonant with the scope of the following claim.

What is claimed is:

In a simulator: a first sheet having printed thereon representations of the outlines of a pair of opposed auricles of a heart, a second and third sheet disposed below said first sheet, representations of an auricle and an alternate ventricle printed on said second sheet, representations of another auricle and another alternate ventricle printed on said third sheet, said second sheet having a transparent area to permit observation of said representations on said third sheet, said first sheet having at least three transparent areas, one of said transparent areas on said first sheet being disposed adjacent each of said auricle representations and the remaining transparent area being sufficiently large to permit observation of said ventricular representations in the expanded position, a fourth sheet having a pair of spaced transverse elongated slots, a fifth sheet, a lever having an aperture therein and being disposed between said fourth and fifth sheets, generally longitudinally extending elongated cam slots in said second, third and fourth sheets, an aperture in said second and third sheets in alignment with each other, a pin traversing said fifth sheet and one of said elongated slots, a pin traversing the other one of said elongated slots and said aligned apertures, and a pin traversing said aperture in said lever and said cam slots.

References Cited by the Examiner
UNITED STATES PATENTS

| | | | |
|---|---|---|---|
| 1,677,569 | 7/28 | Smith | 35—13 |
| 2,074,249 | 3/37 | Bloh | 40—133 |
| 2,494,072 | 1/50 | Vetterli | 35—53 |

JEROME SCHNALL, *Primary Examiner.*